US012242295B2

(12) United States Patent
Braunstein

(10) Patent No.: US 12,242,295 B2
(45) Date of Patent: Mar. 4, 2025

(54) BIASING CIRCUIT PROVIDING BIAS VOLTAGES BASED TRANSISTOR THRESHOLD VOLTAGES

(71) Applicant: Cobham Advanced Electronic Solutions, Inc., Lansdale, PA (US)

(72) Inventor: Matthew Braunstein, Dallas, TX (US)

(73) Assignee: CAES Systems LLC, Arlington, VA (US)

( * ) Notice: Subject to any disclaimer, the term of this patent is extended or adjusted under 35 U.S.C. 154(b) by 5 days.

(21) Appl. No.: 17/468,540

(22) Filed: Sep. 7, 2021

(65) Prior Publication Data

US 2023/0076801 A1 Mar. 9, 2023

(51) Int. Cl.
*G05F 3/20* (2006.01)
*G05F 1/46* (2006.01)

(52) U.S. Cl.
CPC .............. *G05F 3/205* (2013.01); *G05F 1/468* (2013.01)

(58) Field of Classification Search
CPC .......... G05F 1/462; G05F 1/465; G05F 1/468; G05F 1/56; G05F 1/575; G05F 1/562; G05F 1/565; G05F 1/567; G05F 1/569; G05F 1/571; G05F 1/573; G05F 1/5735; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/463; G05F 1/46; G05F 1/461

See application file for complete search history.

(56) References Cited

U.S. PATENT DOCUMENTS 3,624,489 A * 11/1971 Betton .................. G05B 23/02 307/35
3,671,770 A * 6/1972 Frederiksen ............ G05F 1/575 323/281
3,959,713 A * 5/1976 Davis ...................... G05F 1/573 323/278
4,371,843 A * 2/1983 Fang .................. H03F 3/45183 330/288
4,492,997 A * 1/1985 Arai ........................ H03F 3/187

(Continued)

*Primary Examiner* — Sean Kayes
*Assistant Examiner* — Nusrat Quddus
(74) *Attorney, Agent, or Firm* — Morgan, Lewis & Bockius LLP

(57) ABSTRACT

This application is directed to a bias circuit. The bias circuit includes a biasing voltage reference circuit including at least a first transistor. The biasing voltage reference circuit is configured to output a first voltage that depends on a threshold voltage of the first transistor. The bias circuit also includes a differential input circuit coupled to the biasing voltage reference circuit and having two differential inputs. The differential input circuit is configured to receive the first voltage and a reference voltage and generate a second voltage based on a difference between the first voltage and the reference voltage. The bias circuit further includes a buffer circuit coupled to the differential input circuit. The buffer circuit is configured to receive the second voltage and generate a bias voltage based on the second voltage. The bias voltage depends on the threshold voltage of the first transistor.

21 Claims, 4 Drawing Sheets

(56) References Cited

U.S. PATENT DOCUMENTS 4,513,241 A * 4/1985 Bowman ............ H03K 17/0826 327/108
4,587,476 A * 5/1986 Cushman .............. G05F 1/5735 323/276
4,611,126 A * 9/1986 Miller ....................... G06F 1/28 307/64
4,787,007 A * 11/1988 Matsumura ...... H03K 19/00307 323/278
4,851,954 A * 7/1989 Surig ..................... G05D 23/24 323/272
4,887,181 A * 12/1989 Lenz .................. H03K 17/0826 327/512
4,906,913 A * 3/1990 Stanojevic ................ G05F 1/56 323/273
5,061,862 A * 10/1991 Tamagawa ................ G05F 3/30 327/563
5,125,112 A * 6/1992 Pace ......................... G05F 3/30 340/7.32
5,598,122 A * 1/1997 McClure ................. G05F 3/262 327/543
5,699,017 A * 12/1997 Maejima .............. H03G 3/3015 330/280
5,808,458 A * 9/1998 Fujisawa ................. G05F 3/247 323/315
5,847,912 A * 12/1998 Smith ................... H02J 7/0031 361/84
6,232,757 B1 * 5/2001 Afghahi .................. G05F 1/467 323/280
6,268,665 B1 * 7/2001 Bobry ..................... H02J 9/062 307/66
6,292,056 B1 * 9/2001 Hallen ................ H03F 3/45103 330/252
6,294,902 B1 * 9/2001 Moreland ................. G05F 3/30 323/268
6,342,816 B1 * 1/2002 Gradzki .................. H03F 1/223 330/311
6,359,499 B1 * 3/2002 Song ................ H03K 19/00384 327/359
6,703,813 B1 * 3/2004 Vladislav ................ G05F 1/575 323/276
6,771,055 B1 * 8/2004 Bell .......................... G05F 3/30 327/539
6,819,165 B2 * 11/2004 Ho .......................... G05F 1/575 327/540
7,349,190 B1 * 3/2008 Maheedhar ............... G06F 1/28 361/91.5
8,289,009 B1 * 10/2012 Strik ....................... G05F 1/575 323/280
8,395,447 B2 * 3/2013 Nakahashi .............. H03F 3/191 330/254
8,816,756 B1 * 8/2014 Eberlein ................... G05F 3/30 327/539
10,061,340 B1 * 8/2018 Rao ......................... G05F 3/267
10,423,188 B1 * 9/2019 Chen ......................... G05F 3/26
10,637,472 B1 * 4/2020 Mitra ............. H03K 19/018528
10,840,907 B1 * 11/2020 Werking ............ H03K 19/0013
11,353,901 B2 * 6/2022 Chauhan ................. G05F 1/468
11,616,505 B1 * 3/2023 Ock ...................... H04M 1/026 327/558
2001/0010479 A1 * 8/2001 Yano .................... H03K 5/2481 327/541
2002/0011893 A1 * 1/2002 Takai ...................... G05F 3/205 327/534
2002/0079967 A1 * 6/2002 Prentice .............. H03F 3/45085 330/254
2002/0171403 A1 * 11/2002 Lopata ................ H03F 3/45183 323/280
2003/0001676 A1 * 1/2003 Matsushita .......... H03G 3/3042 330/285
2007/0216383 A1 * 9/2007 Al-Shyoukh ........... G05F 1/468 323/280
2008/0136381 A1 * 6/2008 Yang ...................... G11C 5/147 365/189.09
2008/0150502 A1 * 6/2008 Migliavacca ............. G05F 3/30 323/281
2009/0115379 A1 * 5/2009 Al-Shyoukh ............. G05F 1/56 323/238
2009/0201086 A1 * 8/2009 Kindt .................. H03F 3/45103 330/257
2009/0224737 A1 * 9/2009 Lou ......................... G05F 1/563 323/280
2009/0284242 A1 * 11/2009 Motz ......................... G05F 3/30 330/253
2010/0026054 A1 * 2/2010 Queener ................ B62D 25/06 296/210
2010/0102794 A1 * 4/2010 Erbito, Jr. ................. G05F 3/30 323/313
2010/0171547 A1 * 7/2010 Fang ......................... G05F 3/30 327/538
2011/0193641 A1 * 8/2011 Clark ................... H03B 5/1231 331/108 R
2012/0098513 A1 * 4/2012 Terada .................. G05F 1/5735 323/284
2014/0210435 A1 * 7/2014 Nishikawa ............. G05F 1/468 323/271
2014/0292301 A1 * 10/2014 Lee ...................... H03B 5/1253 323/299
2015/0115918 A1 * 4/2015 Oikarinen ............... G05F 1/575 323/280
2016/0085250 A1 * 3/2016 Luo ......................... G05F 1/468 323/281
2016/0149559 A1 * 5/2016 Köllmann .......... H03H 11/1217 327/558
2017/0115677 A1 * 4/2017 Caffee ..................... G05F 1/468
2018/0262164 A1 * 9/2018 Ranta ...................... H03F 3/195
2020/0241584 A1 * 7/2020 Kotrc ...................... G05F 1/565
2021/0018947 A1 * 1/2021 Maki ....................... H02P 7/285
2021/0126594 A1 * 4/2021 Lambrecht .............. H03F 3/082
2021/0181044 A1 * 6/2021 McVeigh .............. H03M 1/785
2022/0011798 A1 * 1/2022 Matyscak ............... G05F 1/565

* cited by examiner

BIASING CIRCUIT PROVIDING BIAS VOLTAGES BASED TRANSISTOR THRESHOLD VOLTAGES

TECHNICAL FIELD

This application relates generally to electronic circuit including, but not limited to, methods, systems, and devices for providing a biasing current using one or more transistors.

BACKGROUND

Compound semiconductor integrated circuits are difficult to bias without using external electronic components. Limited transistor devices are available on a compound semiconductor integrated circuit to make on-chip bias circuits, and resulting bias circuits oftentimes have large performance variation and/or large power consumption. Due to these constraints, customers normally build off-chip biasing circuits (e.g., based on bias resistor ladders) for the compound semiconductor integrated circuits. These biasing circuits are oftentimes implemented using discrete electronic components that incur a higher cost and are difficult to operate. As device integration becomes standard, customers are less willing to design and apply these off-chip hybrid biasing circuits. There is a need for integrated biasing circuit solutions that are efficient in cost and easy to operate, reduces power consumption, and enhances performance variation.

SUMMARY

Various implementations of systems, methods and devices within the scope of the appended claims each have several aspects, no single one of which is solely responsible for the attributes described herein. Without limiting the scope of the appended claims, after considering this disclosure, and particularly after considering the section entitled "Detailed Description" one will understand how the aspects of some implementations are used to self-bias a circuit. The self-biasing circuit uses depletion mode field effect transistors (FETs) to generate an output voltage. Specifically, the biasing circuit provides a threshold reference via a first transistor, and operates as a current source having an offset from a first transistor saturation current $I_{DSS1}$. An intermediate voltage $V_A$ and a reference voltage $V_{ref}$ are fed into a differential pair including at least two transistors. The reference voltage $V_{ref}$ is optionally generated via a voltage divider that is any combination of FET, diode, and/or resistors and configured to enable process variation compensation of one or more predetermined elements. An intermediate output VB of the differential pair is fed into a buffer and scaled through a resistor divider to generate a bias voltage $V_{out}$. In some embodiments, the bias voltage $V_{out}$ is correlated with and tracks a threshold voltage of the transistor devices applied in the biasing circuit. When the bias voltage $V_{out}$ is applied to bias a gate of a circuit transistor, a drain current of the circuit transistor is substantially independent of the threshold voltage.

In one aspect, a bias circuit includes a biasing voltage reference circuit including at least a first transistor. The biasing voltage reference circuit is configured to output a first voltage that depends on a threshold voltage of the first transistor. The bias circuit also includes a differential input circuit coupled to the biasing voltage reference circuit and having two differential inputs. The differential input circuit is configured to receive the first voltage and a reference voltage. The differential input circuit is further configured to generate a second voltage based on a difference between the first voltage and the reference voltage. The bias circuit further includes a buffer circuit coupled to the differential input circuit. The buffer circuit configured to receive the second voltage and generate a bias voltage based on the second voltage. The bias voltage depends on the threshold voltage of the first transistor. In some embodiments, the bias circuit includes only depletion mode field effect transistors (FET), and the first transistor is one of the depletion mode FETs.

In some embodiments, the bias circuit further includes a drive transistor coupled to the buffer circuit. The drive transistor is configured to receive the bias voltage at a gate of the drive transistor and generate a drive current that flows through a drain and a source of the drive transistor. The drive transistor has a threshold voltage that is equal to the threshold voltage of the first transistor. In some embodiments, the bias circuit does not include a current mirror. In some embodiments, the drive current varies less than 5% when the threshold voltage drifts from a nominal threshold value by 0.3V. In some embodiments, the drive current is substantially constant, independently of a drift of the threshold voltage of the first transistor (or any transistor) from a nominal threshold value.

In some embodiments, the biasing voltage reference circuit further includes a plurality of biasing resistors that are arranged in series with each other and with the first transistor. The plurality of biasing resistors has a first end coupled to one of the biasing resistors, a first biasing node coupled between two biasing resistors, and a second biasing node coupled to another two biasing resistors. The biasing voltage reference circuit is biased by itself (and without being coupled to an external reference voltage). A source of the first transistor is coupled to a first end of the plurality of biasing resistors, a gate of the first transistor is coupled to the first biasing node, the first voltage is coupled to the second biasing node. In some embodiments, each of the plurality of biasing resistors includes a self-biased biasing transistor. A drain and a gate of the self-biased biasing transistor are coupled to each other to form a corresponding biasing resistor. Alternatively, in some embodiments, each of the plurality of biasing resistors is a diode.

In some embodiments, the bias circuit further includes a high power rail powered by a high supply voltage and a low power rail powered by a low supply voltage. Each of the biasing voltage reference circuit, differential input amplifier circuit, and buffer circuit is biased between the high power rail and the low power rail, and the high and low supply voltages are held substantially constant, independently of a drift of the threshold voltage of the first transistor (or any other transistor) from a nominal threshold value.

In some embodiments, the reference voltage is independent of a drift of the threshold voltage of the first transistor from a nominal threshold value, and the bias circuit further includes a resistor divider including a plurality of reference resistors arranged in series and configured to generate the reference voltage. In some embodiments, the threshold voltage of the first transistor has a nominal threshold value, and the reference voltage generated by the resistor divider is configured to be equal to the first voltage that is generated when the threshold voltage of the first transistor has no drift from the nominal threshold value. In some embodiments, each of the plurality of reference resistors includes a self-biased reference transistor, a drain and a gate of the self-biased reference transistor being coupled to each other to form a corresponding reference resistor. Alternatively, in some embodiments, each of the plurality of reference resistors is a diode.

In some embodiments, the buffer circuit further includes a buffer transistor having a gate configured to receive the second voltage, a plurality of output resistors that are coupled in series with each other and at a source of the buffer transistor, and an output interface coupled between two output resistors in the plurality of output resistors. The output interface is configured to output the bias voltage. In some embodiments, a drift of the threshold voltage of the first transistor from a nominal threshold value is amplified in the second voltage, and (ratios of) resistances of the plurality of output resistors are configured to scale the bias voltage from a source voltage of the source of the buffer transistor, thereby compensating the amplified drift of the threshold voltage in the second voltage and a drift of a threshold voltage of the buffer transistor from the nominal threshold value. In some embodiments, each of the plurality of output resistors includes a self-biased output transistor, a drain and a gate of the self-biased output transistor being coupled to each other to form a corresponding output resistor. Alternatively, in some embodiments, each of the plurality of reference resistors is a diode.

In some embodiments, the bias circuit is coupled to a drive transistor, the drive transistor configured to receive the bias voltage at a gate of the drive transistor and generate a drive current that flows through a drain and a source of the drive transistor, independently of a drift of the threshold voltage of the first transistor from a nominal threshold value. In some embodiments, the bias circuit is integrated with the drive transistor on a substrate of a semiconductor chip.

In some embodiments, the bias circuit is coupled to a drive transistor. The drive transistor is configured to receive the bias voltage at a gate of the drive transistor and generate a drive current that flows through a drain and a source of the drive transistor. In some embodiments, the bias circuit and the drive transistor are located on two substrates of two distinct semiconductor chips.

In some embodiments, the biasing voltage reference circuit, differential input amplifier, and buffer are formed based on silicon. In some embodiments, the biasing voltage reference circuit, differential input amplifier, and buffer circuit are formed based on III-V compound semiconductors (e.g., GaAs, GaN).

In another aspect, some implementations include a method of manufacturing a bias circuit. The method includes providing a biasing voltage reference circuit including at least a first transistor. The biasing voltage reference circuit is configured to output a first voltage that depends on a threshold voltage of the first transistor. The method further includes providing a differential input circuit coupled to the biasing voltage reference circuit and having two differential inputs. The differential input circuit is configured to receive the first voltage and a reference voltage and generate a second voltage based on a difference between the first voltage and the reference voltage. The method further includes providing a buffer circuit coupled to the differential input circuit. The buffer circuit configured to receive the second voltage and generate a bias voltage based on the second voltage. The bias voltage depends on the threshold voltage of the first transistor. In some embodiments, the bias circuit is manufactured in accordance with any of the above-mentioned embodiments.

In another aspect, a method of generating a bias voltage is performed at a bias circuit. The bias circuit includes biasing voltage reference circuit having at least a first transistor, a differential input circuit coupled to the biasing voltage reference circuit and having two differential inputs, and a buffer circuit coupled to the differential input circuit. The method includes outputting, by the biasing voltage reference circuit, a first voltage that depends on a threshold voltage of the first transistor. The method further includes, receiving, by the differential input circuit, the first voltage and a reference voltage, and generating a second voltage based on a difference between the first voltage and the reference voltage. The method further includes receiving, by the buffer circuit, the second voltage, and generating, by the buffer circuit, a bias voltage based on the second voltage. The bias voltage depends on the threshold voltage of the first transistor.

In some embodiments, the bias circuit further includes a drive transistor coupled to the buffer circuit and the method further includes receiving, by the drive transistor, the bias voltage at a gate of the drive transistor and generating a drive current that flows through a drain and a source of the drive transistor. The drive transistor has a threshold voltage that is equal to the threshold voltage of the first transistor.

In some embodiments, the bias circuit further includes a resistor divider including a plurality of reference resistors arranged in series, and the reference voltage is independent of a drift of the threshold voltage of the first transistor from a nominal threshold value. The method further includes generating, by the resistor divider, the reference voltage. In some embodiment, the threshold voltage of the first transistor has a nominal threshold value and the reference voltage generated by the resistor divider is configured to be equal to the first voltage that is generated when the threshold voltage of the first transistor has no drift from the nominal threshold value.

In some embodiments, the bias circuit further includes a buffer transistor having a gate, a plurality of output resistors that are coupled in series with each other and at a source of the buffer transistor, and an output interface coupled between two output resistors in the plurality of output resistors. The method further includes receiving, by the buffer transistor, the second voltage and outputting, by the output interface, the bias voltage. In some embodiments, a drift of the threshold voltage of the first transistor from a nominal threshold value is amplified in the second voltage, and resistances of the plurality of output resistors are configured to scale the bias voltage from a source voltage of the source of the buffer transistor, thereby compensating the amplified drift of the threshold voltage in the second voltage and a drift of a threshold voltage of the buffer transistor from the nominal threshold value.

In some embodiments, the bias circuit is coupled to a drive transistor. The bias circuit is integrated with the drive transistor on a substrate of a semiconductor chip. The method further includes receiving, by the drive transistor, the bias voltage at a gate of the drive transistor and generating, by the drive transistor, a drive current that flows through a drain and a source of the drive transistor, independently of a drift of the threshold voltage of the first transistor from a nominal threshold value.

In some embodiments, the bias circuit is coupled to a drive transistor, and the bias circuit and the drive transistor are located on two substrates of two distinct semiconductor chips. The method further includes receiving, by the drive transistor, the bias voltage at a gate of the drive transistor, and generating, by the drive transistor, a drive current that flows through a drain and a source of the drive transistor.

Other implementations and advantages may be apparent to those skilled in the art in light of the descriptions and drawings in this specification.

BRIEF DESCRIPTION OF THE DRAWINGS

For a better understanding of the various described implementations, reference should be made to the Detailed Description below.

Like reference numerals refer to corresponding parts throughout the drawings.

DESCRIPTION OF EMBODIMENTS

Numerous details are described herein in order to provide a thorough understanding of the example embodiments illustrated in the accompanying drawings. However, some embodiments may be practiced without many of the specific details, and the scope of the claims is only limited by those features and aspects specifically recited in the claims. Furthermore, well-known processes, components, and materials have not been described in exhaustive detail so as not to unnecessarily obscure pertinent aspects of the embodiments described herein.

Figure 1:
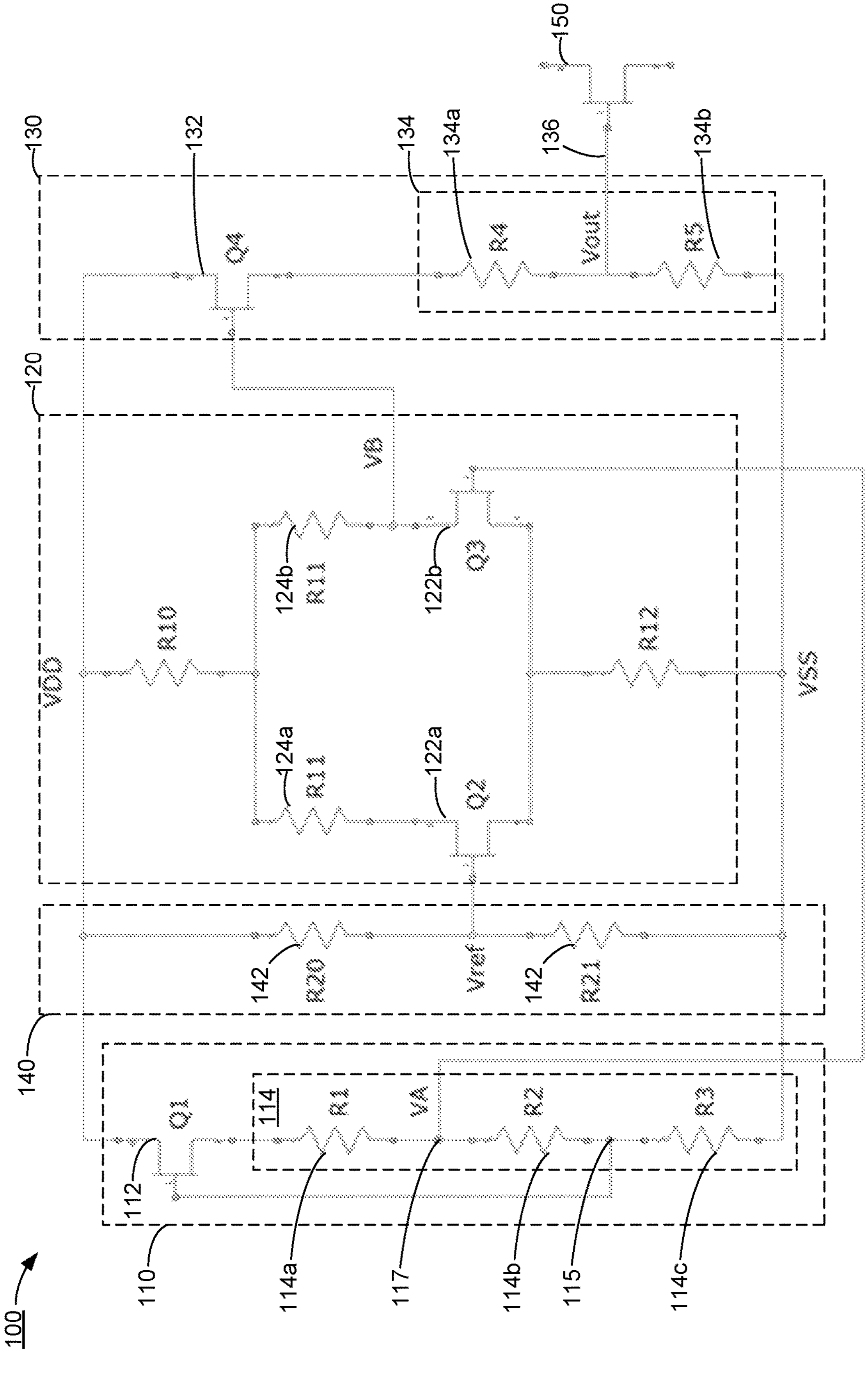
FIG. 1 is a circuit diagram of a bias circuit in accordance with some embodiments.

FIG. 1 is a circuit diagram of a bias circuit 100 in accordance with some embodiments. In some embodiments, the bias circuit 100 includes a biasing voltage reference circuit 110 including at least a first transistor 112 (Q1), a differential input circuit 120 coupled to the biasing voltage reference circuit 110 and having two differential inputs (e.g., $V_{ref}$ and VA), and a buffer circuit 130 coupled to the differential input circuit 120. In some embodiments, the bias circuit 100 includes a resistor divider 140 including a plurality of reference resistors 142 arranged in series and configured to generate a reference voltage $V_{ref}$. The biasing voltage reference circuit 110 is configured to output a first voltage VA that depends on a threshold voltage of the first transistor 112 (Q1). The differential input circuit 120 is configured to receive the first voltage and a reference voltage and generate a second voltage VB based on a difference between the first voltage VA and the reference voltage $V_{ref}$. The buffer circuit 130 is configured to receive the second voltage VB and generate a bias voltage $V_{out}$ based on the second voltage VB. The bias voltage $V_{out}$ depends on the threshold voltage of the first transistor 112 (Q1). In some embodiments, the bias circuit 100 does not include a current mirror. The biasing voltage reference circuit 110, the differential input circuit 120, the biasing voltage reference circuit 110, and the resistor divider 140 are configured such that the bias voltage $V_{out}$ is correlated with and tracks a threshold voltage of the transistors (e.g., transistors Q1-Q3) applied in the bias circuit 100.

Each individual chip of the bias circuit 100 is manufactured from a microfabrication process. Each type of transistors (e.g., depletion mode N-type transistors) has a threshold voltage. The threshold voltage has a nominal threshold value and may varies in a threshold value range containing the nominal threshold value when each transistor of the respective type is manufactured from different processing batches, different wafers of a batch, and/or at different locations of a certain wafer. For example, the depletion model N-type transistor manufactured from a GaAs-based microfabrication process has the nominal threshold value of −1.0 V, and the corresponding threshold value may vary up to a high corner threshold voltage of −0.7 V and a low corner threshold voltage of −1.3 V. For each individual bias circuit 100, a corresponding threshold voltage drifts with temperature. If temperature is stable, the threshold voltage of the bias circuit 100 is fixed, and has a drift with respect to the nominal threshold voltage value of the same type of transistors manufactured from the same type of microfabrication process.

Specifically, in some embodiments, each bias circuit 100 is located at a fixed position of a wafer processed using a known microfabrication process, and each transistor of the bias circuit 100 has a threshold voltage that has a drift with respect to the nominal threshold voltage. The drift of this threshold voltage varies with a temperature of the bias circuit 100, and is optionally distinct from that of another bias circuit 100. In the bias circuit 100, the first voltage VA outputted by the biasing voltage reference 110 changes with the threshold voltage of the first transistor 112 (Q1). In some embodiments, in the context of the biasing voltage reference circuit 110, the first voltage VA depends on the threshold voltage of the first transistor 112 (Q1), and the first voltage VA scales or amplifies a drift of the threshold voltage of the first transistor 112 (Q1) from the nominal threshold value. In some embodiments, in the context of the buffer circuit 130, the bias voltage $V_{out}$ depends on the threshold voltage of the first transistor Q1, and the bias voltage $V_{out}$ changes with the threshold voltage without scaling.

In some embodiments, the bias circuit 100 includes a high power rail (e.g., "VDD") powered by a high supply voltage (e.g., VDD) and a low power rail powered by a low supply voltage (e.g., "VSS"). In some embodiments, each of the biasing voltage reference circuit 110, differential input circuit 120, and buffer circuit 130 is biased between the high power rail and the low power rail. The high and low supply voltages are held substantially constant, independently of a drift of the threshold voltage of the first transistor 112 (Q1) (or any transistor) from a nominal threshold value.

In some embodiments, the biasing voltage reference circuit 110, differential input circuit 120, and buffer circuit 130 are formed based on silicon. In some embodiments, the biasing voltage reference circuit 110, differential input circuit 120, and buffer circuit 130 are formed based on III-V compound semiconductors (e.g., GaN, GaAs). The bias circuit is part of Monolithic Microwave ICs (MMICs). In some embodiments, the bias circuit 100 includes only depletion mode field effect transistors (FET), and the first transistor 112 (Q1) is one of the depletion mode FETs.

In some embodiments, the biasing voltage reference circuit 110 further includes a plurality of biasing resistors 114 that are arranged in series with each other and with the first transistor 112 (Q1). The plurality of biasing resistors 114 have a first end coupled to one of the biasing resistors, a first biasing node 115 coupled between two biasing resistors and a second biasing node 117 coupled to another two biasing resistors. For example, the first biasing node 115 is coupled between second and third biasing resistors 114*b* and 114*c*, and the second biasing node 117 is coupled between first and second biasing resistors 114*a* and 114*b*. In some embodiments, the biasing voltage reference circuit 110 is biased by itself without using an external reference voltage to bias itself. A source of the first transistor 112 (Q1) is coupled to the first end of the plurality of biasing resistors 114 (e.g., first biasing resistor 114*a*), a gate of the first transistor 112 (Q1) coupled to the first biasing node 115, and the first voltage VA is coupled to the second biasing node 117. In some embodiments, each of the plurality of biasing resistors 114 includes a self-biased biasing transistor. A drain and a gate of the self-biased biasing transistor are coupled to each other to form a corresponding biasing resistor. Alternatively, in some embodiments, each of the plurality of biasing resistors 114 is a diode.

A voltage gain ($A_{v1}$) of the first transistor 112 (Q1) is determined by the following equation:

$$A_{v1}=g_{m1}R_{ds1} \quad (1)$$

where $g_{m1}$ is a transconductance of the first transistor 112 (Q1), and $R_{ds1}$ is an on resistance of the first transistor 112 (Q1) (i.e., an internal resistance when the first transistor 112 (Q1) is in a fully conducting state). Further, the first voltage ($V_A$) is determined by the following equation:

$$V_A = \frac{(R_2+R_3)V_{DD}}{R_{ds1}-A_{v1}R_3+(1+A_{v1})(R_1+R_2+R_3)} \quad (2)$$

where $R_1$, $R_2$, and $R_3$ are resistances of the plurality of biasing resistors 114, $R_{ds1}$ is the on resistance of the first transistor 112 (Q1), $A_{v1}$ is the voltage gain of the first transistor 112 (Q1), and VDD is the high power rail voltage.

As descried above, the resistor divider 140 is configured to generate a reference voltage $V_{ref}$. In some embodiments, the reference voltage is independent of a drift of the threshold voltage of the first transistor 112 (Q1) from a nominal threshold value. Different chips having different bias circuit 100 have different threshold voltages, and however, the reference voltages $V_{ref}$ used by the different bias circuits 100 are substantially identical when the high and low power rail voltages are fixed. In some embodiments, the threshold voltage of the first transistor 112 (Q1) has a nominal threshold value and the reference voltage $V_{ref}$ generated by the resistor divider 140 is configured to be equal to the first voltage VA that is generated when the threshold voltage of the first transistor 112 (Q1) has no drift from the nominal threshold value. In some embodiments, each of the plurality of reference resistors 142 includes a self-biased reference transistor, a drain and a gate of the self-biased reference transistor being coupled to each other to form a corresponding reference resistor 142. Alternatively, in some embodiments, each of the plurality of reference resistors 142 is a diode.

In some embodiments, the differential input circuit 120 includes a plurality of differential transistors 122 (e.g., first and second differential transistors 122*a* and 122*b* (Q2 and Q3)). In some embodiment, a first differential transistor 122*a* (Q2) is configured to receive at a gate the reference voltage $V_{ref}$, and a second differential transistor 122*b* (Q3) is configured to receive at a gate the first voltage VA. In some embodiment, the differential input circuit 120 includes a plurality of collector resistors (e.g., first and second collector resistors 124*a* and 124*b*). In some embodiments, a first collector resistor 124*a* is coupled to a drain of the first differential transistor 122*a* and a second collector resistor 124*b* is coupled to a drain of the second differential transistor 122*b*.

A voltage gain ($A_{v2}$) of the first differential transistor 122*a* (Q2) is determined by the following equation:

$$A_{v2}=g_{m2}R_{ds2} \quad (3)$$

where $g_{m2}$ is a transconductance of a first differential transistor 122*a* (Q2), and $R_{ds2}$ is an on resistance of the second differential transistor 122*b* (Q2). A voltage gain ($A_{v3}$) of the second differential transistor 124*b* is determined by the following equation:

$$A_{v3}=g_{m3}R_{ds3} \quad (4)$$

where $g_{m3}$ is a transconductance of the second differential transistor 122*b* (Q3), and $R_{ds3}$ is the resistance between the drain and the source of the second differential transistor 122*b*. In some embodiments, the first and second differential transistors 122 (Q2 and Q3) are identical to each other, and the first and second collector resistors 124*a* and 124*b* are identical to each other.

An output resistance ($R_O$) of the differential input circuit 120 is determined by the following equation:

$$R_o=R_{11}+R_{ds3} \quad (5)$$

where $R_{11}$ is a second collector resistor 124*b*, and $R_{ds3}$ is the on resistance of the second differential transistor 122*b* (Q3).

A resistance across ($R_x$) the differential input circuit 120 is determined by the following equation:

$$R_x=R_{10}+R_{12} \quad (6)$$

where $R_{10}$ is a first resistor coupled between the high power rail voltage and the first and second differential resistors 124, and $R_{12}$ is a second resistor coupled between the low power rail voltage and the sources of the first and second differential transistors 122*a* and 122*b* (Q2 and Q3).

A current $I_x$ for the differential input circuit 120 passes through the second collector resistor 124*b* ($R_{11}$) and is determined by the following equation:

$$I_x = \frac{V_{DD}-V_{SS}+A_{v3}(V_A-V_{SS})-\frac{R_x}{R_o}A_{v3}(V_{ref}-V_A)}{R_0+2R_x} \quad (7)$$

where $R_o$ is the output resistor and $R_x$ is a sum of the first and second resistors $R_{10}$ and $R_{12}$. A differential current $I_{diff}$ of the differential input circuit 120 is determined by the following equation:

$$I_{diff} = \frac{2R_oI_x+A_{v2}(V_{ref}-V_A)}{R_o} \quad (8)$$

where $R_O$ is the output resistance, $A_{v2}$ is the voltage gain of the first differential transistor 122*a* (Q2), $V_{ref}$ is the reference voltage, and $V_A$ is the first voltage.

The second voltage ($V_B$) is determined by the following equation:

$$V_B=R_{ds3}I_x-A_{v3}[V_A-(I_{diff}R_{12}+V_{SS})]I_{diff}R_{12}+V_{SS} \quad (9)$$

where $R_{ds3}$ is the on resistance of the second differential transistor 122*b* (Q3), $A_{v3}$ is the voltage gain of the second differential transistor 122*b* (Q3), $V_A$ is the first voltage, $R_{12}$ is the second resistor, and $V_{SS}$ is the low power rail voltage.

In some embodiments, the buffer circuit 130 includes a buffer transistor 132 (Q4) having a gate configured to receive the second voltage, a plurality of output resistors 134 that are coupled in series with each other and at a source of the buffer transistor 132 (Q4), and an output interface 136 coupled between two output resistors (e.g., first and second output resistors 134*a* and 134*b*) in the plurality of output resistors 134. The output interface 136 is configured to output the bias voltage $V_{out}$. In some embodiments, a drift of the threshold voltage of the first transistor 112 (Q1) from a nominal threshold value is amplified in the second voltage VB. The second voltage VB drops by a threshold voltage at a source of the buffer transistor 132 (Q4), and therefore, the amplified drift of the threshold voltage is reduced by the threshold voltage at the source of the buffer transistor 132 (Q4). A ratio of resistances of the plurality of output resistors 134 further scales a source voltage of the source of the buffer transistor 132 (Q4), thereby compensating the amplified drift of the threshold voltage in the second voltage and a drift of a threshold voltage of the buffer transistor 132 (Q4) from the nominal threshold value. In some embodiments, each of the plurality of output resistors 134 includes a self-biased output transistor, a drain and a gate of the self-biased output transistor being coupled to each other to form a corresponding output resistor. Alternatively, in some embodiments, each of the plurality of output resistors 134 is a diode.

A voltage gain ($A_{v4}$) of the buffer transistor 132 (Q4) is determined by the following equation:

$$A_{v4}=g_{m4}R_{ds4} \tag{10}$$

where $g_{m4}$ is a transconductance of the buffer transistor 132 (Q4), and $R_{ds4}$ is an on resistance of the buffer transistor 132 (Q4).

Further, the bias voltage ($V_{out}$) is determined by the following equation:

$$V_{out} = R_5\frac{V_{DD}-(1+A_{v4})V_{SS}+A_{v4}V_B}{R_{ds4}+(1+A_{v4})(R_4+R_5)}+V_{SS} \tag{11}$$

where $R_4$ and $R_5$ are resistors of the plurality of output resistors 134, $R_{ds4}$ is the on resistance of the buffer transistor 132 (Q4), $A_{v4}$ is a voltage gain of the buffer transistor 132 (Q4), $V_B$ is the second voltage, VSS is the low power rail voltage, and VDD is the high power rail voltage.

In some embodiments, the bias circuit 100 is coupled to a drive transistor 150 (Q5). The drive transistor 150 (Q5) is configured to receive the bias voltage $V_{out}$ at a drive transistor gate and generate a drive current that flows through a drive transistor drain and a drive transistor source, independently of a drift of the threshold voltage of the first transistor 112 (Q1) from a nominal threshold value. Stated another way, two distinct bias circuits 100 correspond to two distinct threshold voltages of the transistors Q1-Q4, and two drive currents passing drains of the drive transistors 150 (Q5) of the two distinct bias circuits 100 are substantially constant and independent of the two distinct threshold voltages, when the same high power rail voltages and the same low power rail voltages are applied to power the two distinct bias circuits 100. In some embodiments, the bias circuit 100 is integrated with the drive transistor 150 (Q5) on a substrate of a semiconductor chip. Alternatively, in some embodiments, the drive transistor 150 (Q5) configured to receive the bias voltage at the drive transistor gate and generate a drive current that flows through the drive transistor drain and the drive transistor source, and the bias circuit 100 and the drive transistor 150 (Q5) are located on two substrates of two distinct semiconductor chips.

In some embodiments, the low supply voltage VSS is biased at a negative voltage level, and a source of the drive transistor 150 (Q5) is grounded. Alternatively, in some embodiments not shown in FIG. 1, the low supply voltage VSS is biased at a ground voltage level, and a source of the drive transistor 150 (Q5) is biased at a positive voltage level.

In some embodiments, the drive transistor 150 is coupled to the buffer circuit 130 and configured to receive the bias voltage $V_{out}$ at the drive transistor gate and generate a drive current that flows through the drive transistor drain and the drive transistor source. The drive transistor 150 (Q5) has a threshold voltage that is equal to the threshold voltage of the first transistor 112 (Q1). In some embodiments, the drive current varies less than 5% when the threshold voltage drifts from a nominal threshold value by 0.3V. In some embodiments, the drive current is substantially constant, independently of a drift of the threshold voltage of the first transistor 112 (Q1) (or any transistor Q2-Q5) from a nominal threshold value.

Figure 2:
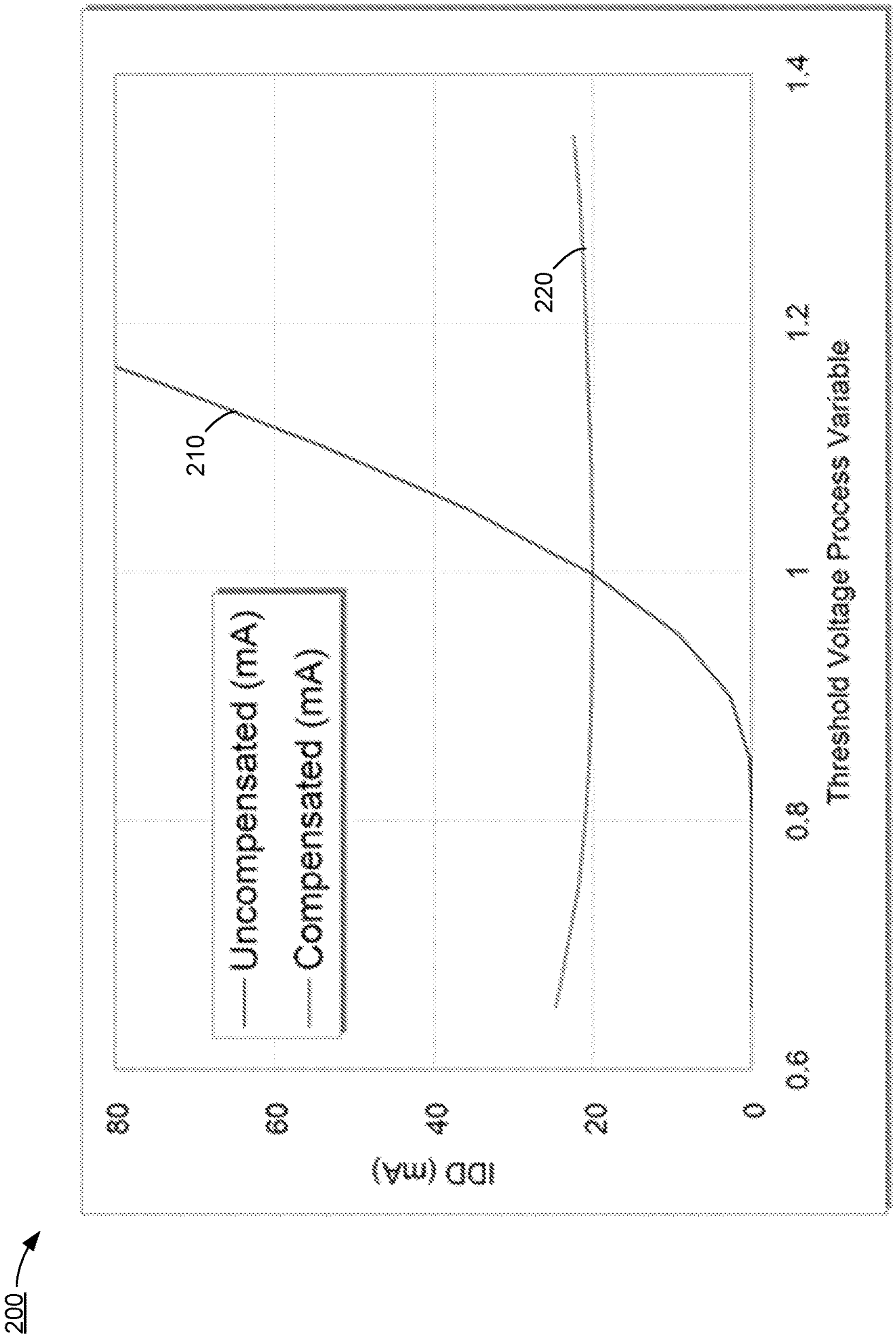
FIG. 2 is a plot illustrating example performance improvement provided by a bias circuit, in accordance with some embodiments.

FIG. 2 is a plot 200 illustrating example performance improvement provided by a bias circuit 100, in accordance with some embodiments. The bias circuit 100 applies a plurality of transistors (e.g., Q1-Q4) having the same transistor types. A size of each transistor is configured to give desirable circuit performance. Each transistor has a respective threshold voltage that drifts from a nominal threshold voltage value as a result of a processing variation. For example, the nominal threshold voltage value corresponding to a process nominal condition is −1.0 V. The plurality of transistors of the bias circuit 100, if processed differently or located differently on a wafer, have a threshold voltages drift caused by a process condition drifting between 65-135% of the process nominal condition. For example, the threshold voltage of the transistors drifts between −0.83 V and −1.18 V. Plot 200 has a Y-axis representing a drive current (IDD) of a drive transistor 150 and an X-axis representing a threshold voltage in a threshold value range. As shown in plot 200 incorporation of the bias circuit 100 results in substantially constant current biasing (represented by Compensated line 220). In some embodiments, a drive current is regarded as a substantially constant current, if the drive current varies less than a threshold percentage (e.g., 5%) across the threshold value range. Alternatively, without the use of the bias circuit 100, the current biasing steadily increases (represented by Uncompensated line 210) beyond 80 mA.

Figure 3:
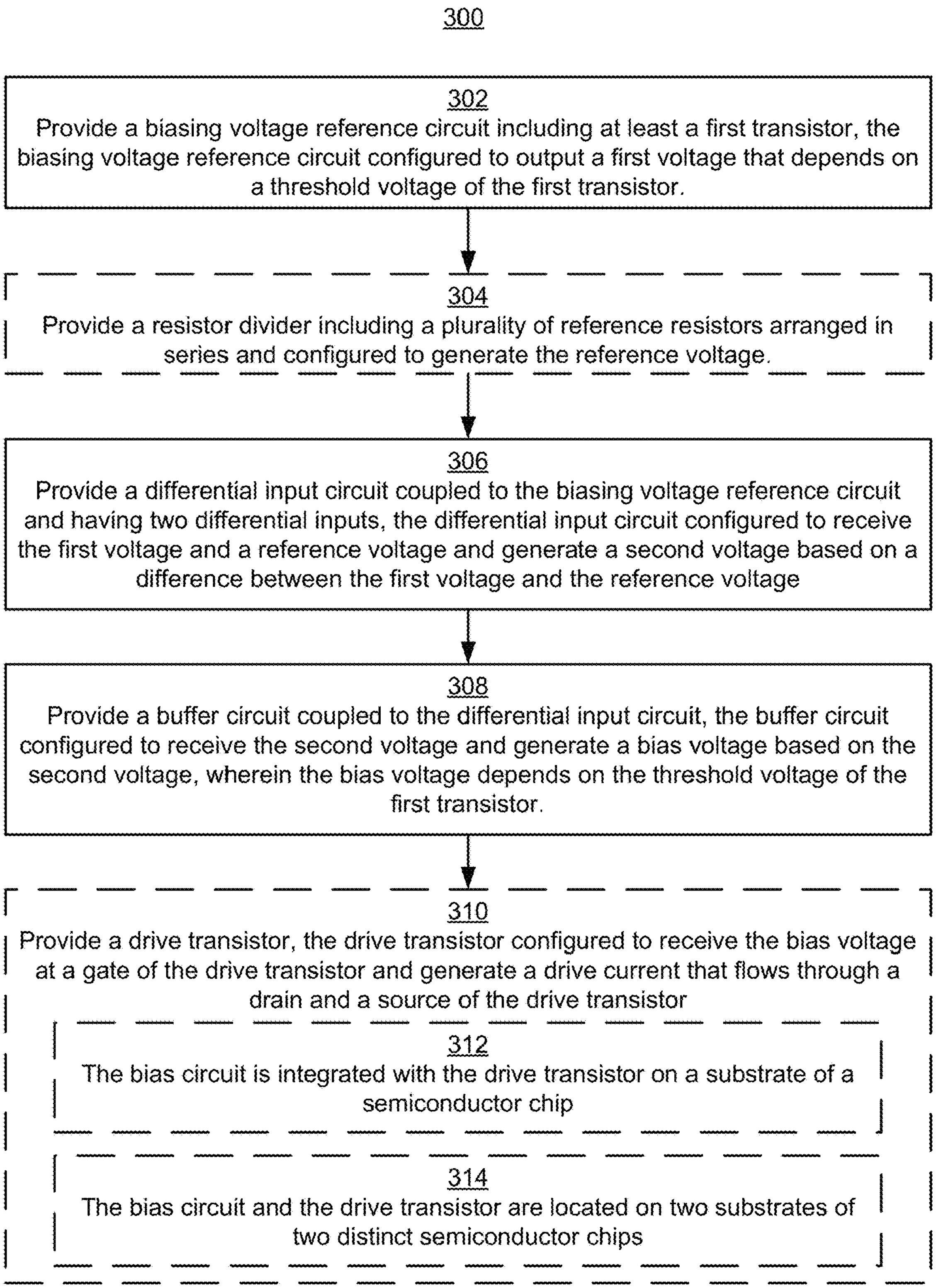
FIG. 3 is a flowchart of a method of manufacturing a bias circuit, in accordance with some embodiments.

FIG. 3 is a flowchart of a method of providing a bias circuit, in accordance with some embodiments. The bias circuit is provided in accordance with one or more of the features described above in reference to FIG. 1. The method 300 includes providing (302) a biasing voltage reference circuit 110 including at least a first transistor (e.g., a first transistor 112 (Q1) in FIG. 1). The biasing voltage reference circuit 110 is configured to output a first voltage $V_A$ that depends on a threshold voltage of the first transistor. In some embodiments, the method 300 includes providing (304) a resistor divider 140 including a plurality of reference resistors 142 arranged in series and configured to generate a reference voltage $V_{ref}$.

The method 300 includes providing (306) a differential input circuit 120 coupled to the biasing voltage reference circuit 110 and having two differential inputs. The differential input circuit 120 is configured to receive the first voltage VA and the reference voltage $V_{ref}$ and generate a second voltage VB based on a difference between the first voltage VA and the reference voltage $V_{ref}$.

In some embodiments, the method 300 includes providing (308) a buffer circuit 130 coupled to the differential input circuit 120. The buffer circuit 130 is configured to receive the second voltage VB and generate a bias voltage $V_{out}$ based on the second voltage VB, the bias voltage $V_{out}$ depending on the threshold voltage of the first transistor. In some embodiments, the method 300 includes providing (310) a drive transistor 150. The drive transistor 150 is configured to receive the bias voltage $V_{out}$ at a gate of the drive transistor 150 and generate a drive current that flows through a drain and a source of the drive transistor 150. In some embodiments, the bias circuit 100 is (312) integrated with the drive transistor 150 on a substrate of a semiconductor chip. Alternatively, in some embodiments, the bias circuit 100 (including circuits 110, 120, 130, and 140) and the drive transistor 150 are (314) located on two substrates of two distinct semiconductor chips.

Figure 4:
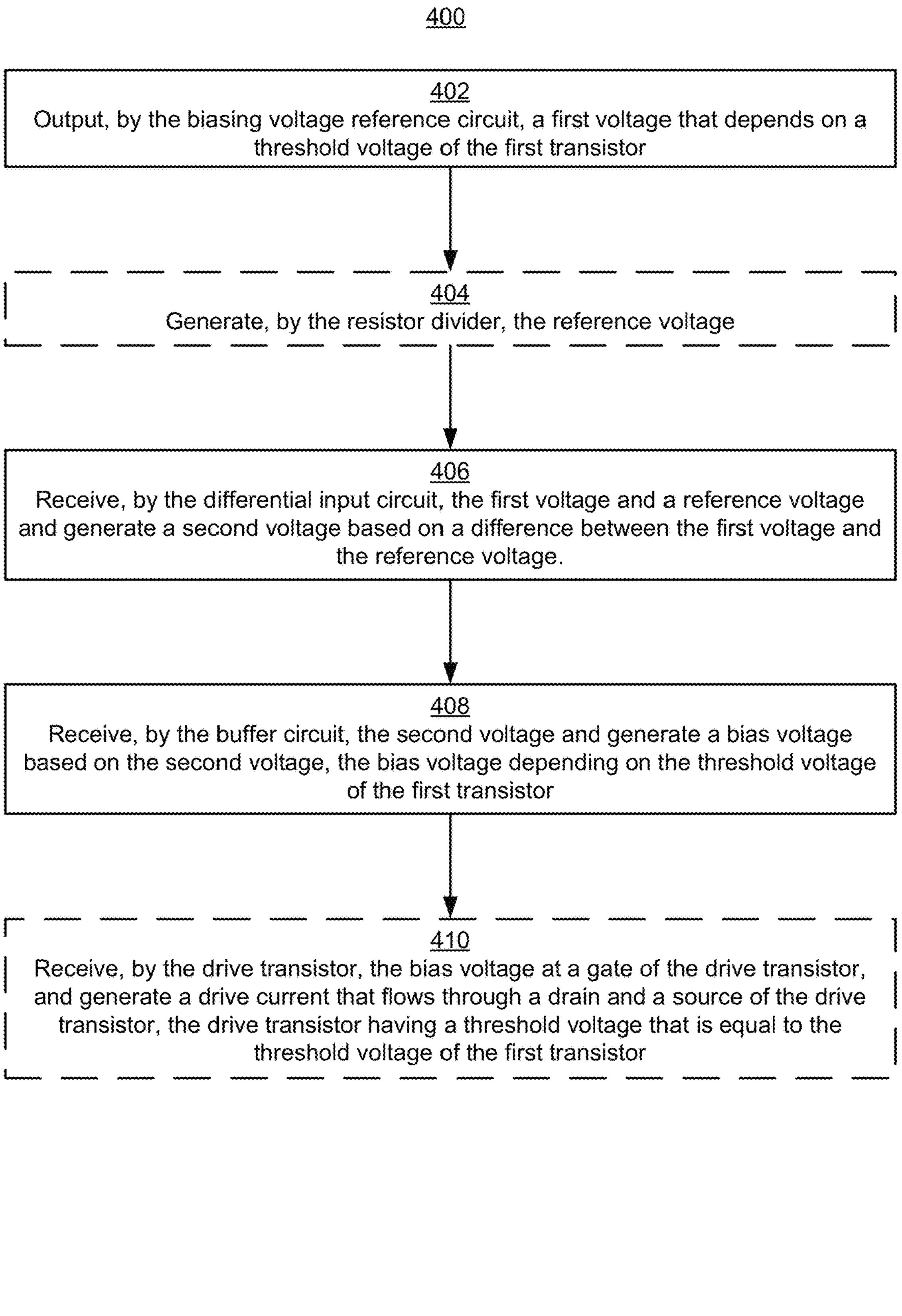
FIG. 4 is a flowchart of a method implemented at a bias circuit, in accordance with some embodiments.

FIG. 4 is a flowchart of a method 400 implemented at a bias circuit, in accordance with some embodiments. In some embodiments, the method 400 is performed at a bias circuit 100 including biasing voltage reference circuit 110 including at least a first transistor, a differential input circuit 120 coupled to the biasing voltage reference circuit 110 and having two differential inputs, and a buffer circuit 130 coupled to the differential input circuit 120. In some embodiments, the bias circuit 100 includes a resistor divider 140 and/or a drive transistor 150. Additional information on the bias circuit 100 and its one or more components is provided above in reference to FIG. 1. Method 400 includes outputting (402), by the biasing voltage reference circuit 110, a first voltage VA that depends on a threshold voltage of the first transistor 112 (Q1). In some embodiments, the method 400 includes generating (404), by the resistor divider 140, a reference voltage $V_{ref}$. The method 400 includes receiving (406), by the differential input circuit 120, the first voltage VA and reference voltage $V_{ref}$ and generate a second voltage VB based on a difference between the first voltage VA and the reference voltage $V_{ref}$.

The method 400 further includes receiving (408), by the buffer circuit 130, the second voltage VB and generating a bias voltage $V_{out}$ based on the second voltage VB. The bias voltage VB depends on the threshold voltage of the first transistor 112 (Q1). In some embodiments, the method 400 includes receiving (410), by the drive transistor 150, the bias voltage $V_{out}$ at a gate of the drive transistor 150 (Q5) and generating a drive current that flows through a drain and a source of the drive transistor 150 (Q5). The drive transistor 150 (Q5) having a threshold voltage that is equal to the threshold voltage of the first transistor 112 (Q1). In some embodiments shown in FIG. 1, the low supply voltage VSS is biased at a negative voltage level, and a source of the drive transistor 150 (Q5) is grounded.

In some embodiments of this application, the bias circuit 100 is manufactured as an electronic component by itself or integrated on the same substrate with electronic circuit that are biased (e.g., the drive transistor 150 (Q5)). No or few external active or pass electronic components are applied to enable operation and integration of the bias circuit 100, thereby reducing packaging parastics and conserving power consumptions. The bias voltage $V_{out}$ optionally depends on a threshold voltage of the transistors (e.g., Q1-Q5). When the bias voltage $V_{out}$ is applied to bias the drive transistor 150 (Q5), a drive current provided by the drive transistor 150 (Q5) is substantially constant and independent of any drift of the threshold voltage of the transistors. The bias voltage $V_{out}$ is proportional to the threshold voltage and tracks any drift of the threshold voltage of the transistors applied in the bias circuit 100. By these means, the bias circuit 100 provides an integrated biasing solution that is efficient in cost and easy to operate, reduces power consumption, and enhances performance variation.

It should be understood that the particular order in which the operations in FIGS. 3 and 4 have been described are merely exemplary and are not intended to indicate that the described order is the only order in which the operations could be performed. One of ordinary skill in the art would recognize various ways to reorder the operations described herein. Additionally, it should be noted that details of processes described herein with respect to methods 300 and 400 (e.g., FIGS. 3 and 4) are also applicable in an exchangeable manner. For brevity, these details are not repeated.

The above description has been provided with reference to specific embodiments. However, the illustrative discussions above are not intended to be exhaustive or to be limiting to the precise forms disclosed. Many modifications and variations are possible in view of the above teachings. The embodiments were chosen and described in order to best explain the principles disclosed and their practical applications, to thereby enable others to best utilize the disclosure and various embodiments with various modifications as are suited to the particular use contemplated.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. Additionally, it will be understood that, although the terms "first," "second," etc. may be used herein to describe various elements, these elements should not be limited by these terms. These terms are only used to distinguish one element from another.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

Although various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages can be implemented in hardware, firmware, software or any combination thereof.

Clause 1. A method, comprising:

at a bias circuit including biasing voltage reference circuit including at least a first transistor, a differential input circuit coupled to the biasing voltage reference circuit and having two differential inputs, and a buffer circuit coupled to the differential input circuit:

outputting, by the biasing voltage reference circuit, a first voltage that depends on a threshold voltage of the first transistor;

receiving, by the differential input circuit, the first voltage and a reference voltage;

generating, by the differential input circuit, a second voltage based on a difference between the first voltage and the reference voltage receiving, by the buffer circuit, the second voltage; and generating, by the buffer circuit, a bias voltage based on the second voltage, wherein the bias voltage depends on the threshold voltage of the first transistor.

Clause 2. The method of clause 1, wherein the bias circuit further includes a drive transistor coupled to the buffer circuit, the method further comprising:

receiving, by the drive transistor, the bias voltage at a gate of the drive transistor; and generating, by the drive transistor, a drive current that flows through a drain and a source of the drive transistor;

wherein the drive transistor has a threshold voltage that is equal to the threshold voltage of the first transistor.

Clause 3. The method of clause 1, wherein the bias circuit further includes a resistor divider including a plurality of reference resistors arranged in series and the reference voltage is independent of a drift of the threshold voltage of the first transistor from a nominal threshold value, the method further comprising:

generating, by the resistor divider, the reference voltage.

Clause 4. The method of clause 3 wherein:

the threshold voltage of the first transistor has a nominal threshold value; and the reference voltage generated by the resistor divider is configured to be equal to the first voltage that is generated when the threshold voltage of the first transistor has no drift from the nominal threshold value.

Clause 5. The method of clause 1, wherein the bias circuit further includes a buffer transistor having a gate, a plurality of output resistors that are coupled in series with each other and at a source of the buffer transistor, and an output interface coupled between two output resistors in the plurality of output resistors, the method further comprising:

receiving, by the buffer transistor, the second voltage; and outputting, by the output interface, the bias voltage.

Clause 6. The method of clause 5, wherein a drift of the threshold voltage of the first transistor from a nominal threshold value is amplified in the second voltage, and resistances of the plurality of output resistors are configured to scale the bias voltage from a source voltage of the source of the buffer transistor, thereby compensating the amplified drift of the threshold voltage in the second voltage and a drift of a threshold voltage of the buffer transistor from the nominal threshold value.

Clause 7. The method of clause 1, wherein the bias circuit is coupled to a drive transistor, the bias circuit being integrated with the drive transistor on a substrate of a semiconductor chip, the method further comprising:

receiving, by the drive transistor, the bias voltage at a gate of the drive transistor; and generating, by the drive transistor, a drive current that flows through a drain and a source of the drive transistor, independently of a drift of the threshold voltage of the first transistor from a nominal threshold value.

Clause 8. The method of clause 1, wherein the bias circuit is coupled to a drive transistor, the bias circuit and the drive transistor being located on two substrates of two distinct semiconductor chips, the method further comprising:

receiving, by the drive transistor, the bias voltage at a gate of the drive transistor; and generating, by the drive transistor, a drive current that flows through a drain and a source of the drive transistor.

What is claimed is:

1. A bias circuit, comprising:

a biasing voltage reference circuit including at least a first transistor, the biasing voltage reference circuit configured to output a first voltage that changes with a threshold voltage of the first transistor;

a differential input circuit coupled to the biasing voltage reference circuit and having two differential inputs, the differential input circuit configured to receive the first voltage and a reference voltage via the two differential inputs and generate a second voltage based on a difference between the first voltage and the reference voltage; and a buffer circuit coupled to the differential input circuit, the buffer circuit configured to receive the second voltage and generate a bias voltage based on the second voltage, wherein the bias voltage tracks the threshold voltage of the first transistor of the biasing voltage reference circuit, wherein the reference voltage received by the differential input circuit is distinct from the bias voltage generated by the buffer circuit;

wherein the biasing voltage reference circuit is not controlled by the buffer circuit and the differential input circuit.

2. The bias circuit of claim 1, further comprising:

a drive transistor coupled to the buffer circuit and configured to receive the bias voltage at a gate of the drive transistor and generate a drive current that flows through a drain and a source of the drive transistor;

wherein the drive transistor has a threshold voltage that is equal to the threshold voltage of the first transistor.

3. The bias circuit of claim 2, wherein the bias circuit does not include a current mirror.

4. The bias circuit of claim 2, wherein the drive current varies less than 5% when the threshold voltage drifts from a nominal threshold value by 0.3V.

5. The bias circuit of claim 2, wherein the drive current is substantially constant, independently of a drift of the threshold voltage of the first transistor from a nominal threshold value.

6. A bias circuit of claim 1, wherein:

the biasing voltage reference circuit further includes a plurality of biasing resistors that are arranged in series with each other and with the first transistor, the plurality of biasing resistors having a first end coupled to one of the biasing resistors, a first biasing node coupled between two biasing resistors and a second biasing node coupled to another two biasing resistors; and the biasing voltage reference circuit is biased by itself, a source of the first transistor coupled to a first end of the plurality of biasing resistors, a gate of the first transistor coupled to the first biasing node, the first voltage coupled to the second biasing node.

7. The bias circuit of claim 6, wherein each of the plurality of biasing resistors includes a self-biased biasing transistor, a drain and a gate of the self-biased biasing transistor being coupled to each other to form a corresponding biasing resistor.

8. The bias circuit of claim 6, further comprising:

a high power rail powered by a high supply voltage; and a low power rail powered by a low supply voltage;

wherein each of the biasing voltage reference circuit, differential input circuit, and buffer circuit is biased between the high power rail and the low power rail, and the high and low supply voltages are held substantially constant, independently of a drift of the threshold voltage of the first transistor from a nominal threshold value.

9. The bias circuit of claim 1, where the reference voltage is independent of a drift of the threshold voltage of the first transistor from a nominal threshold value, further comprising:

a resistor divider including a plurality of reference resistors arranged in series and configured to generate the reference voltage.

10. The bias circuit of claim 9, wherein:

the threshold voltage of the first transistor has a nominal threshold value; and the reference voltage generated by the resistor divider is configured to be equal to the first voltage that is generated when the threshold voltage of the first transistor has no drift from the nominal threshold value.

11. The bias circuit of claim 10, wherein each of the plurality of reference resistors includes a self-biased reference transistor, a drain and a gate of the self-biased reference transistor being coupled to each other to form a corresponding reference resistor.

12. A bias circuit, comprising:

a biasing voltage reference circuit including at least a first transistor, the biasing voltage reference circuit configured to output a first voltage that changes with a threshold voltage of the first transistor;

a differential input circuit coupled to the biasing voltage reference circuit and having two differential inputs, the differential input circuit configured to receive the first voltage and a reference voltage via the two differential inputs and generate a second voltage based on a difference between the first voltage and the reference voltage; and a buffer circuit coupled to the differential input circuit, the buffer circuit configured to receive the second voltage and generate a bias voltage based on the second voltage, wherein the bias voltage tracks the threshold voltage of the first transistor of the biasing voltage reference circuit, wherein the reference voltage received by the differential input circuit is distinct from the bias voltage generated by the buffer circuit;

wherein the buffer circuit further comprises: a buffer transistor having a gate configured to receive the second voltage; a plurality of output resistors that are coupled in series with each other and at a source of the buffer transistor; and an output interface coupled between two output resistors in the plurality of output resistors, the output interface configured to output the bias voltage.

13. The bias circuit of claim 12, wherein a drift of the threshold voltage of the first transistor from a nominal threshold value is amplified in the second voltage, and resistances of the plurality of output resistors are configured to scale the bias voltage from a source voltage of the source of the buffer transistor, thereby compensating the amplified drift of the threshold voltage in the second voltage and a drift of a threshold voltage of the buffer transistor from the nominal threshold value.

14. The bias circuit of claim 12, wherein each of the plurality of output resistors includes a self-biased output transistor, a drain and a gate of the self-biased output transistor being coupled to each other to form a corresponding output resistor.

15. The bias circuit of claim 1, wherein the bias circuit includes only depletion mode field effect transistors (FET), and the first transistor is one of the depletion mode FETs.

16. The bias circuit of claim 1, wherein:

the bias circuit is coupled to a drive transistor, the drive transistor configured to receive the bias voltage at a gate of the drive transistor and generate a drive current that flows through a drain and a source of the drive transistor, independently of a drift of the threshold voltage of the first transistor from a nominal threshold value; and the bias circuit is integrated with the drive transistor on a substrate of a semiconductor chip.

17. The bias circuit of claim 1, wherein:

the bias circuit is coupled to a drive transistor, the drive transistor configured to receive the bias voltage at a gate of the drive transistor and generate a drive current that flows through a drain and a source of the drive transistor; and the bias circuit and the drive transistor are located on two substrates of two distinct semiconductor chips.

18. The bias circuit of claim 1, wherein the biasing voltage reference circuit, differential input circuit, and buffer are formed based on silicon.

19. The bias circuit of claim 1, wherein the biasing voltage reference circuit, differential input circuit, and buffer circuit are formed based on III-V compound semiconductors.

20. A method of manufacturing a bias circuit, the method comprising:

providing a biasing voltage reference circuit including at least a first transistor, the biasing voltage reference circuit configured to output a first voltage that changes with a threshold voltage of the first transistor;

providing a differential input circuit coupled to the biasing voltage reference circuit and having two differential inputs, the differential input circuit configured to receive the first voltage and a reference voltage via the two differential inputs and generate a second voltage based on a difference between the first voltage and the reference voltage; and providing a buffer circuit coupled to the differential input circuit, the buffer circuit configured to receive the second voltage and generate a bias voltage based on the second voltage, wherein the bias voltage tracks the threshold voltage of the first transistor of the biasing voltage reference circuit, wherein the reference voltage received by the differential input circuit is distinct from the bias voltage generated by the buffer circuit;

wherein the biasing voltage reference circuit is not controlled by the buffer circuit and the differential input circuit.

21. The method of claim 20, further providing a drive transistor coupled to the buffer circuit and configured to receive the bias voltage at a gate of the drive transistor and generate a drive current that flows through a drain and a source of the drive transistor, wherein the drive transistor has a threshold voltage that is equal to the threshold voltage of the first transistor.

* * * * *